US012673418B2

(12) United States Patent
Yamashita et al.

(10) Patent No.: US 12,673,418 B2
(45) Date of Patent: Jul. 7, 2026

(54) POWER ASSIST SYSTEM AND STORAGE MEDIUM

(71) Applicants: TOYOTA JIDOSHA KABUSHIKI KAISHA, Toyota (JP); TOYOTA SCHOOL FOUNDATION, Nagoya (JP)

(72) Inventors: Masashi Yamashita, Miyoshi (JP); Yuhei Yamaguchi, Toyota (JP); Hitoshi Yamada, Toyota (JP); Tatsuo Narikiyo, Nagoya (JP)

(73) Assignees: TOYOTA JIDOSHA KABUSHIKI KAISHA, Toyota (JP); TOYOTA SCHOOL FOUNDATION, Nagoya (JP)

( * ) Notice: Subject to any disclaimer, the term of this patent is extended or adjusted under 35 U.S.C. 154(b) by 245 days.

(21) Appl. No.: 18/544,759

(22) Filed: Dec. 19, 2023

(65) Prior Publication Data

US 2024/0269839 A1 Aug. 15, 2024

(30) Foreign Application Priority Data

Feb. 9, 2023 (JP) ................................. 2023-018087

(51) Int. Cl.
*B25J 9/16* (2006.01)
*B25J 9/00* (2006.01)
(52) U.S. Cl.
CPC ........... *B25J 9/1633* (2013.01); *B25J 9/0006* (2013.01); *B25J 9/163* (2013.01)

(58) Field of Classification Search
CPC ........ B25J 9/1633; B25J 9/0006; B25J 9/163; B25J 13/00
See application file for complete search history.

(56) References Cited

U.S. PATENT DOCUMENTS 10,970,936 B2 * 4/2021 Osborn ................... A61B 5/01

FOREIGN PATENT DOCUMENTS

JP 6947613 B2 10/2021

* cited by examiner

*Primary Examiner* — Basil T. Jos
(74) *Attorney, Agent, or Firm* — Oliff PLC

(57) ABSTRACT

A power assist system according to the present disclosure includes: a robot that is worn by a user, the robot including a drive source that assists action of the user; an interference force estimation unit that estimates an interference force given from the user to the robot; an admittance model that generates a target velocity in a virtual object having a predetermined dynamic characteristic, the target velocity corresponding to the interference force estimated by the interference force estimation unit; and a control unit, in which the interference force estimation unit includes: a disturbance observer that detects a disturbance based on the momentum of the robot; and an estimation unit that estimates the interference force depending on the disturbance detected by the disturbance observer, using an ESN learning model for which learning about the interference force depending on the disturbance is performed while weights in a reservoir layer are stochastically assigned.

5 Claims, 6 Drawing Sheets

LEARNING MODE

ESTIMATION MODE

LEARNING MODE

- - - HIP JOINT INTERFERENCE TORQUE
—— HIP JOINT LEARNING INTERFERENCE TORQUE

- - - KNEE JOINT INTERFERENCE TORQUE
—— KNEE JOINT LEARNING INTERFERENCE TORQUE

ESTIMATION MODE

- - - HIP JOINT INTERFERENCE TORQUE
—— HIP JOINT ESTIMATED INTERFERENCE TORQUE

- - - KNEE JOINT INTERFERENCE TORQUE
—— KNEE JOINT ESTIMATED INTERFERENCE TORQUE

ESTIMATION MODE (NO ESN)

HIP JOINT INTERFERENCE TORQUE

HIP JOINT ESTIMATED INTERFERENCE TORQUE

KNEE JOINT INTERFERENCE TORQUE

KNEE JOINT ESTIMATED INTERFERENCE TORQUE

POWER ASSIST SYSTEM AND STORAGE MEDIUM

CROSS-REFERENCE TO RELATED APPLICATION

This application claims priority to Japanese Patent Application No. 2023-018087 filed on Feb. 9, 2023, incorporated herein by reference in its entirety.

BACKGROUND

1. Technical Field

The present disclosure relates to a power assist system and a storage medium.

2. Description of Related Art

In recent years, the development of a power assist device that assists the action of a wearer has been advanced. For example, a related technology is disclosed in Japanese Patent No. 6947613.

Japanese Patent No. 6947613 discloses a power assist device using an assist-as-needed (AAN) control technique in which the assist for the wearer is small when a following error between a trajectory of the wearer's body and a target trajectory is small and in which the assist for the wearer is larger as the following error is larger.

SUMMARY

The AAN control disclosed in Japanese Patent No. 6947613 is a control to follow the target trajectory designated in advance, and therefore a wearer cannot freely manipulate a robot according to the wearer's intention. In order to enable the wearer to freely manipulate the robot according to the wearer's intention, it is necessary to measure an interference force that acts between the wearer who indicates the intention and the robot. However, generally, in the wearable power assist system, the measurement of the interference force by a sensor is difficult except in a case where the wearer himself/herself can exactly operate the signals of a force sensor.

The present disclosure has been made in view of the above circumstance, and has an object to provide a power assist system and a storage medium that allow a power assist according to the intention of a user that wears a robot for which the measurement by a force sensor is difficult, by accurately estimating the interference force that is given from the user to the robot.

A power assist system according to the present disclosure includes: a robot that is worn by a user, the robot including a drive source that assists action of the user; an interference force estimation unit that estimates an interference force given from the user to the robot; an admittance model that generates a target velocity in a virtual object having a predetermined dynamic characteristic, the target velocity corresponding to the interference force estimated by the interference force estimation unit; and a control unit that drives the drive source by a control torque that allows the velocity of the robot to follow the target velocity, in which the interference force estimation unit includes: a disturbance observer that detects a disturbance based on the momentum of the robot; and an estimation unit that estimates the interference force depending on the disturbance detected by the disturbance observer, using an ESN learning model for which learning about the interference force depending on the disturbance is performed while weights in a reservoir layer are stochastically assigned. The power assist system accurately estimates the interference force that is given from a user that wears the robot, to the robot. Thereby, the power assist system can realize a high-accuracy admittance control, and therefore can perform a power assist according to user's intention.

A storage medium storing a control program according to the present disclosure is a storage medium storing a control program causing a computer to execute an assist process by a power assist system including a robot that is worn by a user, the robot including a drive source that assists action of the user, the control program causing the computer to execute: a process of estimating an interference force given from the user to the robot; a process of generating a target velocity in a virtual object having a predetermined dynamic characteristic, the target velocity corresponding to the interference force; and a process of driving the drive source by a control torque that allows the velocity of the robot to follow the target velocity, the control program causing the computer to, in the process of estimating the interference force, execute: a process of detecting a disturbance based on a momentum of the robot by a disturbance observer; and a process of estimating the interference force depending on the disturbance detected by the disturbance observer, using an ESN learning model for which learning about the interference force depending on the disturbance is performed while weights in a reservoir layer are stochastically assigned. The control program accurately estimates the interference force that is given from a user that wears the robot, to the robot. Thereby, the control program can realize a high-accuracy admittance control, and therefore can perform a power assist according to user's intention.

The present disclosure can provide a power assist system and a storage medium that allow a power assist according to the intention of a user that wears a robot for which the measurement by a force sensor is difficult, by accurately estimating the interference force that is given from the user to the robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
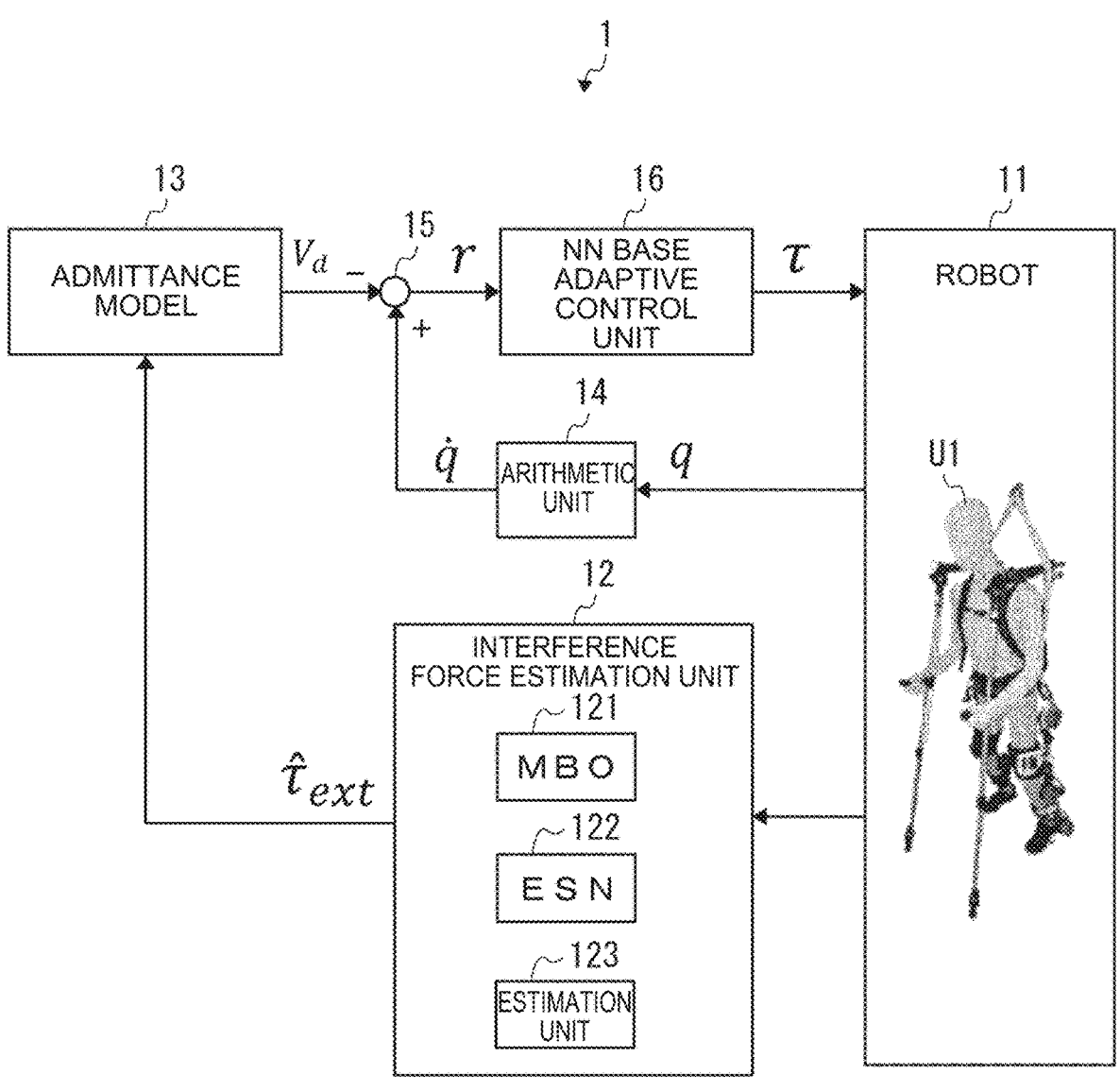
FIG. 1 is a block diagram showing the configuration of a power assist system according to an embodiment 1.

The present disclosure will be described below with embodiments of the disclosure. The disclosure according to the claims is not limited to the embodiments described below. Further, all configurations described in the embodiments are not necessary as means for solving the problem. For clear explanation, in the following descriptions and drawings, omissions and simplifications are performed when appropriate. In the drawings, identical elements are denoted by identical reference characters, and repetitive descriptions are omitted as necessary.

Embodiment 1

FIG. 1 is a block diagram showing the configuration of a power assist system 1 according to an embodiment 1. The power assist system 1 according to the embodiment accurately estimates an interference force that is given from a user that wears a robot, to the robot. Thereby, the power assist system 1 according to the embodiment can realize a high-accuracy admittance control, and therefore can perform a power assist according to user's intention. Specific descriptions will be made below.

As shown in FIG. 1, the power assist system 1 includes a robot 11, an interference force estimation unit 12, an admittance model 13, an arithmetic unit 14, a subtracter 15, and an NN base adaptive control unit 16.

The robot 11 is worn by a user U1 that needs action assist, and assists the motion of the user U1. For example, the robot 11 includes support members that support sites of the lower limbs of the user U1 and rotation members that are provided so as to correspond to joints of the lower limbs of the user U1. Each rotation member connects two support members of the support members in a rotatable manner, and includes an actuator (drive source) that drives and rotates the two support members, as exemplified by a servomotor, and an angle sensor such as a rotary encoder. The robot 11 is not limited to the attachment to the lower limbs of the user U1, and may be attached to the upper limbs of the user U1 or the upper limbs and lower limbs of the user U1.

The interference force estimation unit 12 estimates an interference force that is a force given from the user U1 that wears the robot 11 to the robot 11. Accordingly, it can be said that the interference force indicates the intention about the action of the user U1. Specifically, the interference force estimation unit 12 includes an MBO 121, an ESN 122, and an estimation unit 123.

The MBO 121 is a kind of disturbance observer, and outputs a variable S corresponding to the interference force, based on the momentum of the robot 11. MBO is an abbreviation for Momentum Based Observer. The ESN 122 is an ESN learning model that performs learning about an interference force $\bullet \tau_{ext}$ depending on the variable S while weights in a reservoir layer in a reservoir computing learning are stochastically assigned. ESN is an abbreviation for Echo State Network. The estimation unit 123 estimates an interference force $\tau_{ext}(t)$ depending on the variable S output from the MBO 121, using the learning model of the ESN 122.

In the embodiment, an example in which the MBO that is a kind of disturbance observer is used is described, but without being limited to this, a kind of disturbance observer other than the MBO may be used. Further, in the embodiment, an example in which the ESN that is a kind of reservoir computing technique is used is described, without being limited to this, a kind of reservoir computing technique other than the ESN may be used.

The admittance model 13 generates a target velocity Vd in a virtual object having a predetermined dynamic characteristic, and the target velocity Vd corresponds to the interference force estimated by the interference force estimation unit 12. The arithmetic unit 14 calculates an actual velocity q of the robot 11, from detection results of angle sensors and others attached to the robot 11. The subtracter 15 outputs a velocity error (following error) r that is the difference between the target velocity Vd and the actual velocity q of the robot 11.

The NN base adaptive control unit 16 is an adaptive control system that is configured using a neural network. Specifically, the NN base adaptive control unit 16 assures a uniform ultimate boundedness in which the velocity error $r=\dot{q}-V_d(t)$ is within a certain range even when a physical parameter in the dynamics between the user U1 and the robot 11 is not known, by an adaptive law (adaptive term) in the neural network.

Here, when q, $\dot{q}$, $\ddot{q} \in R^n$ are respectively a joint angle, angular velocity and angular acceleration in a human-machine system in which the user U1 and the robot 11 are integrated and that is configured by n joints, a motion equation for the system is expressed as the following Expression (1).

[Expression 1]

$$M(q)\,\ddot{q} + C\,(q,\dot{q})\,\dot{q} + F(\dot{q}) + G(q) + T_d = \tau_{ext} + \tau \ \dots \tag{1}$$

$M(q)\,\ddot{q}$ indicates inertia force. Here, $M(q) \in R^{n+n}$ is satisfied.

$C(q,\dot{q})\dot{q}$ indicates Coriolis centrifugal force. Here, $C(q,\dot{q}) \in R^{n+n}$ is satisfied.

$F(\dot{q}) \in R^n$ indicates non-linear or linear friction.

$G(q) \in R^n$ indicates gravity.

$T_d \in R^n$ indicates an unknown dynamics for which modeling cannot be performed.

Further, $\tau_{ext}$, to be precise, is described as an interference torque that acts between the user U1 and the robot 11, in accordance with the definition in mechanics, but is descried as the interference force, hereinafter, as long as misunderstanding is not given, because there is only a relation of linear transformation using a Jacobian matrix or the like, between force and torque.

Further, $\tau$ indicates control torque.

The MBO 121 estimates the interference force $\tau_{ext}$, using the generalized momentum of the robot 11, as described below.

First, when the generalized momentum is $p=M(q)\dot{q}$, the MBO 121 is designed such that the following Expression (2), Expression (3) and Expression (4) are satisfied.

[Expression 2]

$$\dot{P} = \tau - \beta(q, \dot{q}) + s \; \ldots \tag{2}$$

[Expression 3]

$$\beta \, (q, \dot{q}) = C(q, \dot{q})\dot{q} + F(\dot{q}) + G(q) - \dot{M}(q)\dot{q} \; \ldots \tag{3}$$

[Expression 4]

$$\dot{s} = K_0\left(\dot{p} - \dot{\hat{p}}\right) \; \ldots \tag{4}$$

$K_0 \in R^{n+n}$ indicates an observer gain. The observer gain is a positive definite matrix.

Thereby, the following Expression (5) is satisfied.

[Expression 5]

$$\dot{s} = K_0(\tau_{ext} - s) \; \ldots \tag{5}$$

Accordingly, in the case of $T_d=0$, $S \rightarrow \tau_{ext}$ is assured. The MBO 121 can sense the contact between the user U1 and the robot 11 with a high sensitivity. In the construction of the MBO 121 that is the disturbance observer, an accurate mathematical model for the user U1 and the robot 11 is necessary. However, in the power assist system in which the robot is worn, an accurate modeling is impossible, and there is always a modeling error. The system is strongly influenced by the modeling error, so that a large estimation error is generated. For compensating the estimation error that is generated by the MBO, the interference force estimation unit 12 employs a hybrid learning technique that is one reservoir computing technique ant in which an ESN model is combined with the MBO.

Next, a learning model that is included in the estimation unit 123 and that is called an ESN will be described.

Figure 2:
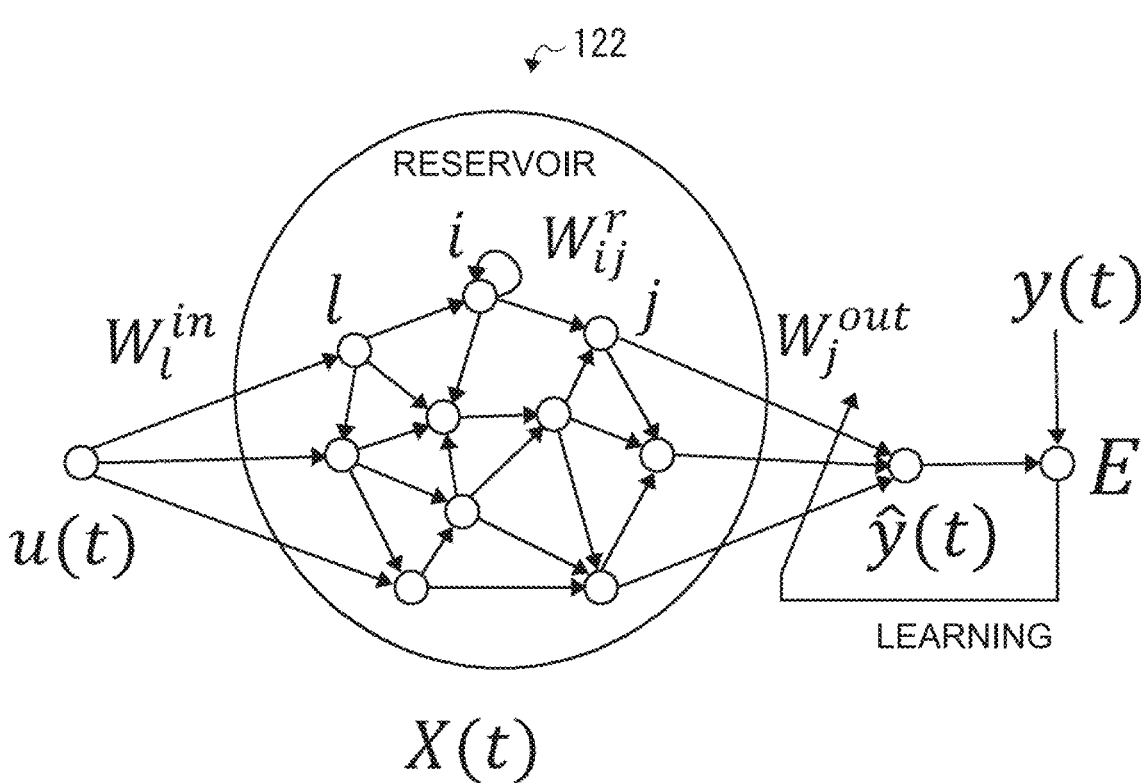
FIG. 2 is a conceptual diagram of an echo state network model that is provided in the power assist system according to the embodiment 1.

FIG. 2 is a conceptual diagram of the ESN model. In FIG. 2, x(t) and $\tilde{X}(t) \in R^{Nx}$ indicate the state of the reservoir layer, and $u(t) \in R^{Nx}$ indicates an input of the ESN 122. $\hat{y}(t) \in R^n$ indicates an output of the ESN 122. In the embodiment, the variables of the ESN 122 are decided depending on one of the two estimation techniques of a series estimation and a parallel estimation. In the ESN model, an output $\hat{y}(t)$ for an input signal u(t) is calculated as described below.

$W^{in} \in R^{Nx \times Nu}$ indicates an input connection weight.

$W^r \in R^{Nx \times Nx}$ indicates a recurrent connection weight.

$W^{out} \in R^{n \times (1+Nu \times Nx)}$ indicates an output connection weight.

In the case where the state of the reservoir is $x(t) \in R^{Nx}$, when $\tilde{x}_1 \in R^P$ and $\tilde{x}_2 \in R^{Nx-P}$ are satisfied and $x=[\tilde{x}_1{}^T \tilde{x}_2{}^T]^T$ is satisfied, respective time evolutions of $\tilde{x}_1$ and $\tilde{x}_2$ are expressed as the following Expression (6) and Expression (7).

[Expression 6]

$$\tilde{x}_1(t) = \tanh\left(W^{in}u(t) + W^r\tilde{X}(t-1) + W^b\right)\big|_p^1 \; \ldots \tag{6}$$

[Expression 7]

$$\tilde{x}_2(t) = W^{in}u(t) + W^r\tilde{X}(t-1) + W^b\big|_{Nx}^{p+1} \; \ldots \tag{7}$$

Here, $$x\big|_b^a$$

indicates a vector resulting from cutting a vector x from an a-line to a b-line. That is, the dimension of $\tilde{x}_1$ is p, and the dimension of $\tilde{x}_2$ is $N_x-P$. In Expression (6) and Expression (7), p is a parameter that gives a mixing ratio $(p/N_x)$ between a non-linear dynamics and a linear dynamics.

$W^b \in R^{Nx}$ indicates a bias term.

Further, when $\alpha \in [0,1]$ is a leak rate, the following Expression (8) is satisfied.

[Expression 8]

$$\tilde{X}(t) = (1 - \alpha)\tilde{X}(t-1) + \alpha x(t) \; \ldots \tag{8}$$

As the leak rate $\alpha$ is higher, the contribution rate of new input information is lower, and as the leak rate $\alpha$ is lower, the contribution rate of the new input information is higher.

Furthermore, when $X(t)=[1u^T(t)\tilde{X}^T(t)]^T$ is defined, the output $\hat{y}(t)$ is calculated by the following Expression (9). T at a right shoulder of a vector or matrix indicates the transposition of the vector or matrix.

[Expression 9]

$$\hat{y}(t) = W^{out}X(t) \; \ldots \tag{9}$$

In the reservoir computing learning, only the learning of the output connection weight is performed. Other connection weights are initialized by random numbers, and are fixed. In the learning of the output connection weight $W^{out}$ a least squared method is generally used, but in the embodiment, the learning is performed as described below, using teaching signals (u(t), y(t)) and an iterative least squares method.

[Expression 10]

$$P(t) = P(t-1) - \frac{P(t-1)X(t)X^T(t)P(t-1)}{1 + X^T(t)P(t-1)X(t)} \; \ldots \tag{10}$$

[Expression 11]

$$P(0) = \beta I \; \ldots \tag{11}$$

$P(t) \in R^{(1+Nu+Nx) \times (1+Nu+Nx)}$ indicates an update matrix, and $\beta$ indicates an arbitrary positive constant. I is an identity matrix of $(1+N_u+N_x) \times (1+N_u+N_x)$.

[Expression 12]

$$W\_(t) = W\_(t-1) - P(t)X(t)\left\{X^T(t)W\_(t-1) - y^T(t)\right\} \; \ldots \tag{12}$$

When the ultimate point of W_ in the iterative learning is W_($t_{end}$), the output connection weight for calculating the output $\hat{y}(t)$ from the input signal u(t) is $W^{out}=W^T\_(t_{end})$.

Figure 3:
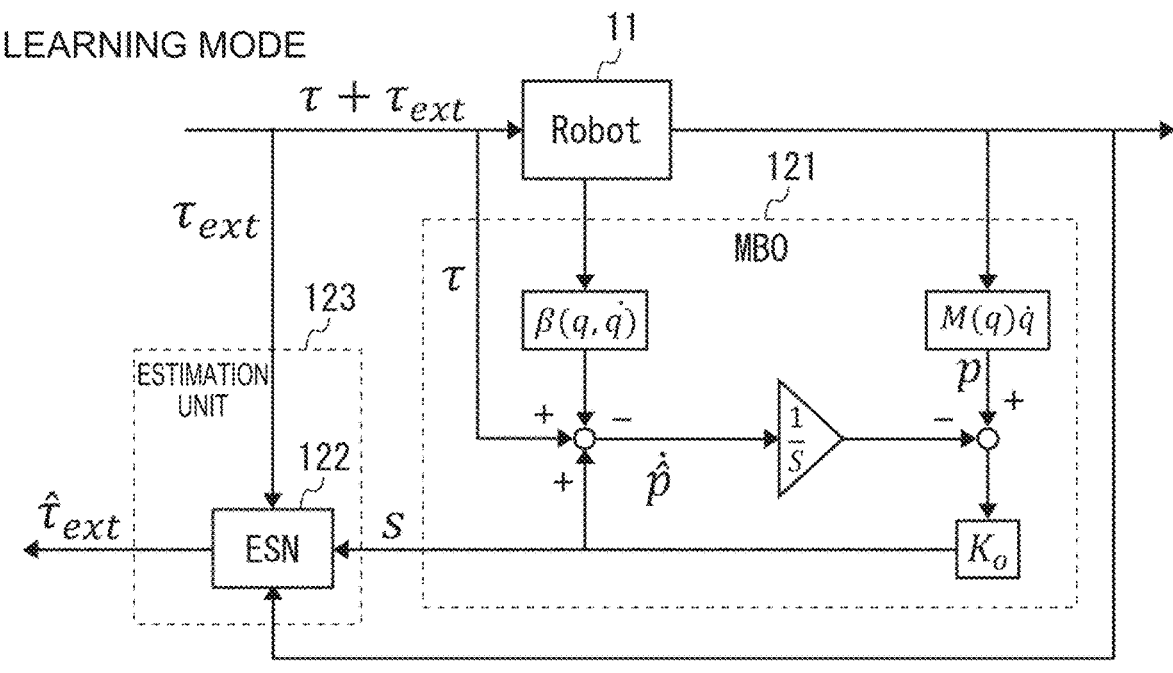
FIG. 3 is a block diagram for describing operations in respective operation modes in an interference force series estimation method of the power assist system according to the embodiment 1.
Figure 3:
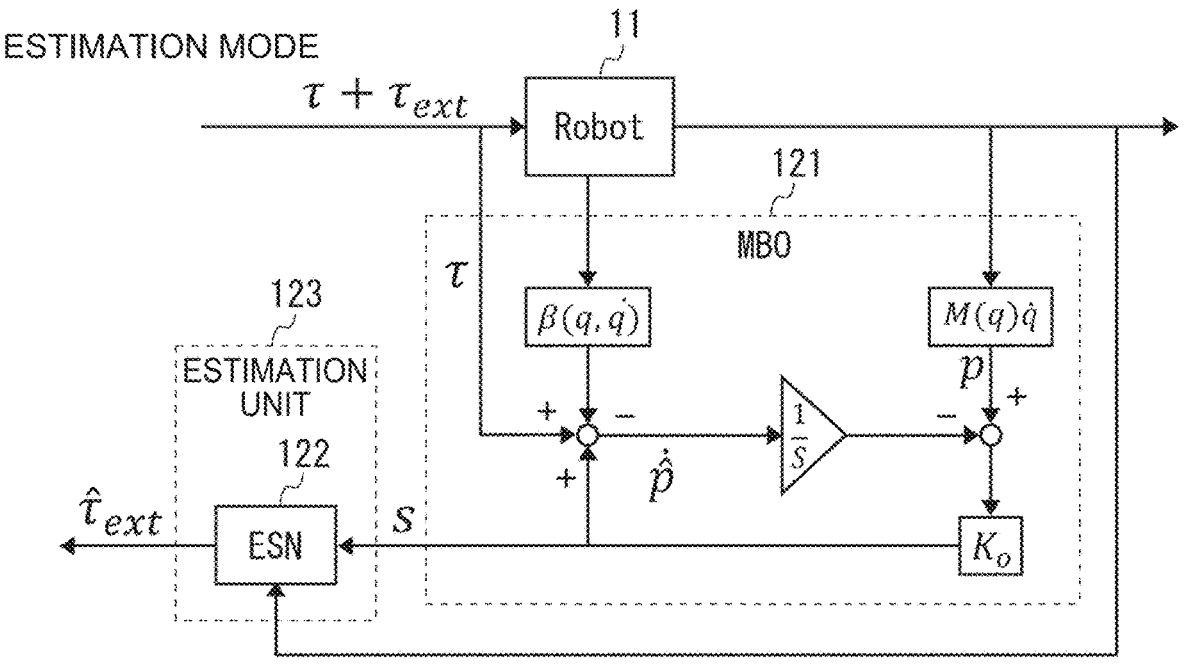

In an example in FIG. 3 in the embodiment, a series estimation method in which the output of the MBO 121 is input to the ESN 122 is employed in the interference force estimation unit 12. The description will be briefly made below with use of FIG. 3.

FIG. 3 is a diagram for describing operations in respective operation modes of the power assist system 1 in which the series estimation method is employed. As shown in FIG. 3, in the case where the operation mode is an estimation mode, an output value S of the MBO 121 is directly input to the ESN 122.

In the case of each of the learning mode and the estimation mode, the input signal u(t) to the ESN 122 is u(t)=[$S^T$(t)$q^T$(t)$\dot{q}^T$(t)$\tau^T$(t)]$^T$. Further, the output y(t) of the teaching signal in the learning mode is y(t)=$t_{ext}$(t). Moreover, in the estimation mode, the output $\hat{y}$(t) of the ESN 122 gives an estimated value $\hat{y}$(t)=$\hat{\tau}_{ext}$(t) of the interference force $\tau_{ext}$.

Figure 4:
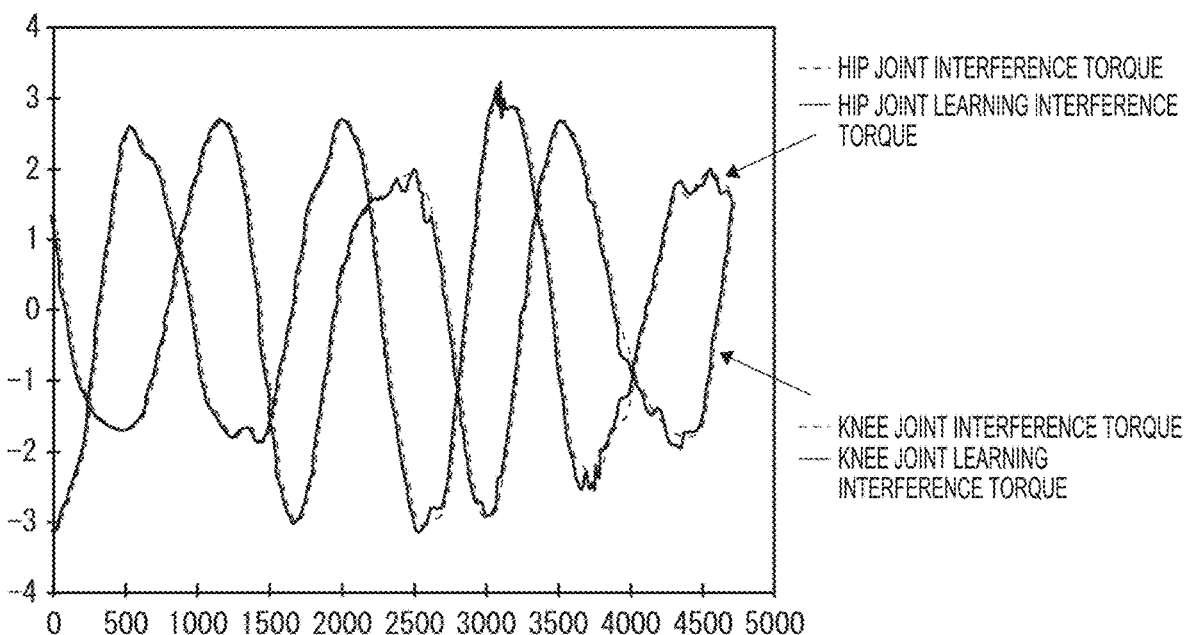
FIG. 4 is a diagram showing experimental results in the respective operation modes in the interference force series estimation method of the power assist system according to the embodiment 1.
Figure 4:
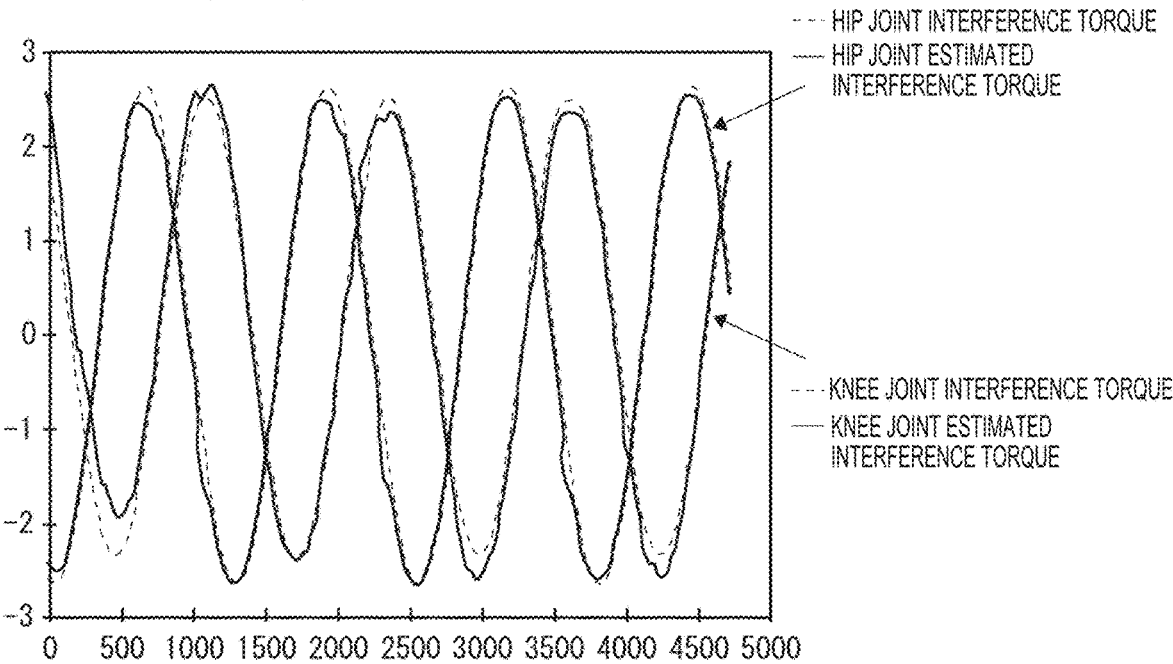

FIG. 4 is a diagram showing experimental results in the respective operation modes of the power assist system 1. In the description of the experimental results, for avoiding misunderstanding, $\tau_{ext}$ is described as the interference torque, and $\hat{\tau}_{ext}$ is described as an estimated interference torque. In the case where the operation mode is the learning mode, the error between the teaching data (dotted line) for the interference torque and a learning interference torque (solid line) that is a learning result is very small. Also in the estimation mode in which the interference torque different from the teaching data is used, the error between verification data (dotted line) for the interference torque and the estimated interference torque (solid line) that is an estimation result is very small. That is, the estimation accuracy of the interference torque by the interference force estimation unit 12 is very high. The experiment was performed such that the sampling time was 5 ms (millisecond). That is, one step on the abscissa axis in FIG. 4 is 5 ms. The interference torque on the ordinate axis is indicated as moment (Nm).

Figure 5:
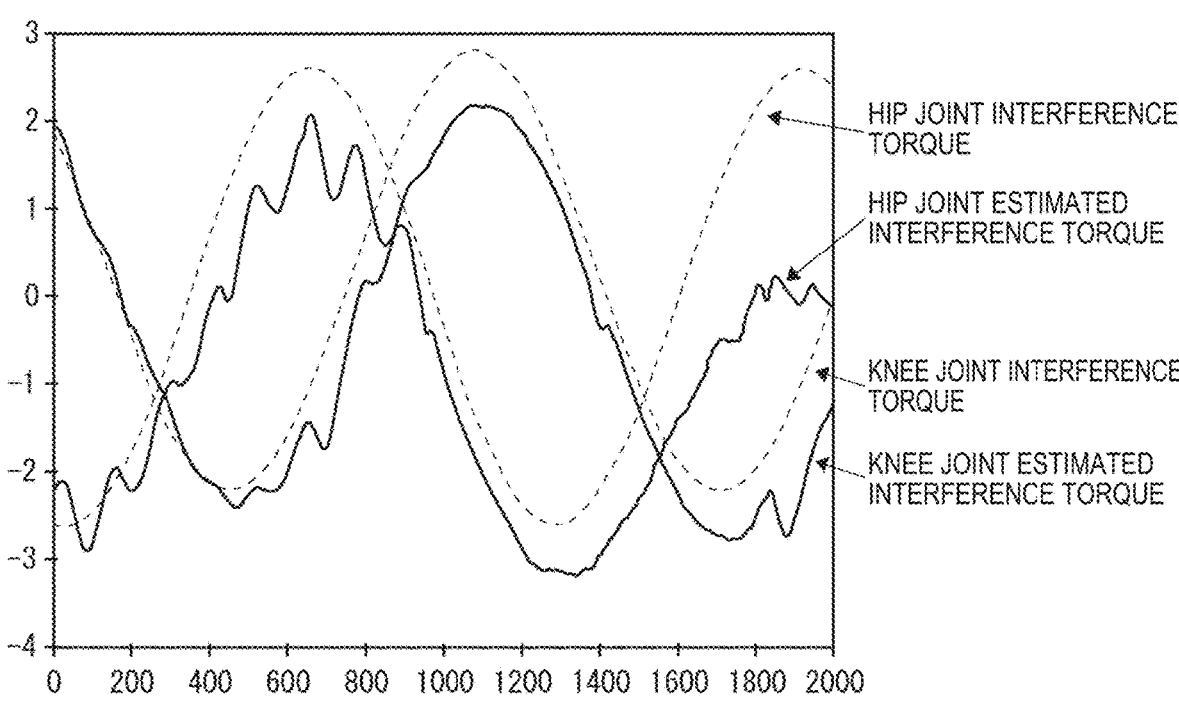
FIG. 5 is a diagram showing experimental results in an estimation mode of the power assist system in the case where an echo state network is not used, that is, in the case where an interference force is estimated by only a disturbance observer.

On the other hand, as shown in FIG. 5, in an interference force estimation in which only the MBO is used, the error between verification data (dotted line) for the interference torque and the estimated interference torque that is an estimation result is large. Accordingly, in the interference force estimation in which only the MBO is used, the estimation accuracy of the interference torque is low.

In this way, the power assist system 1 according to the embodiment can accurately estimate the interference force that is given from the user that wears the robot, to the robot, by using the combination of the MBO 121 and the ESN 122 instead of using the force sensor. Thereby, the power assist system 1 according to the embodiment can realize a high-accuracy admittance control, and therefore can perform a power assist according to user's intention.

The present disclosure is not limited to the above embodiment, and can be appropriately modified without departing from the spirit.

In the embodiment, the example in which the series estimation method in which the output of the MBO 121 is input to the ESN 122 is employed in the interference force estimation unit 12 has been described, but the present disclosure is not limited to this. In the interference force estimation unit 12, a parallel estimation method in which the MBO 121 and the ESN 122 are used in parallel may be employed. The description will be briefly made below with use of FIG. 6.

Figure 6:
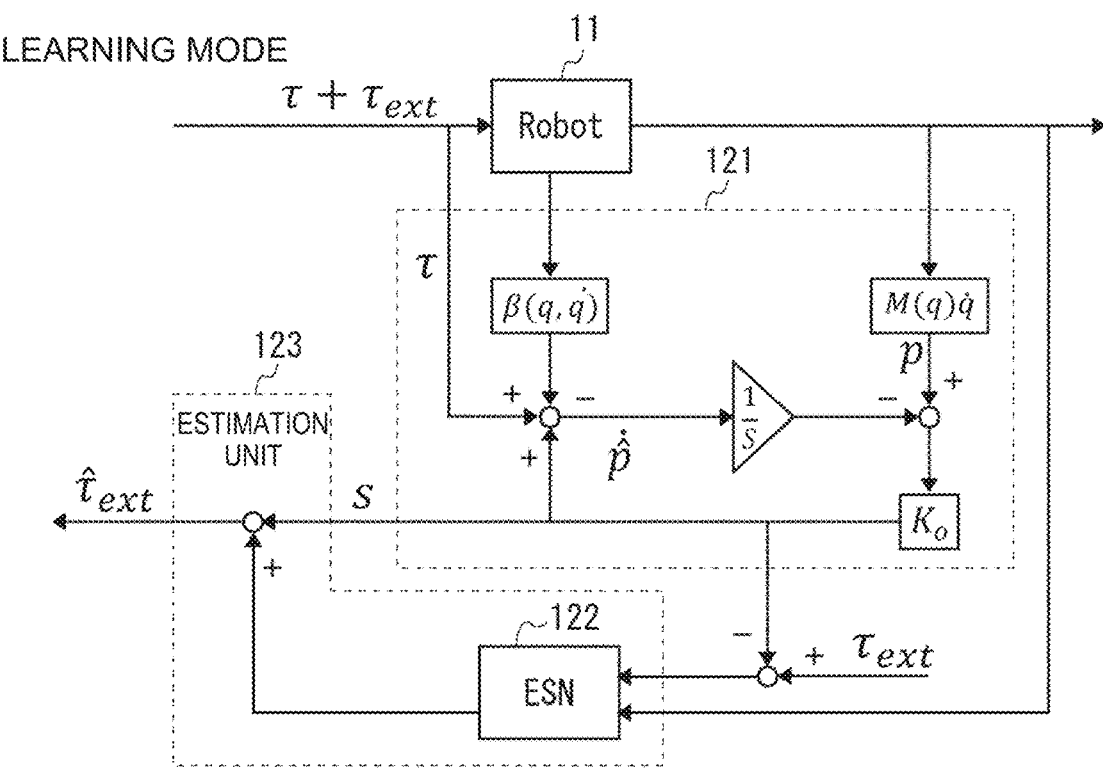
FIG. 6 is a block diagram for describing operations in the respective operation modes in an interference force parallel estimation method of the power assist system according to the embodiment 1.
Figure 6:
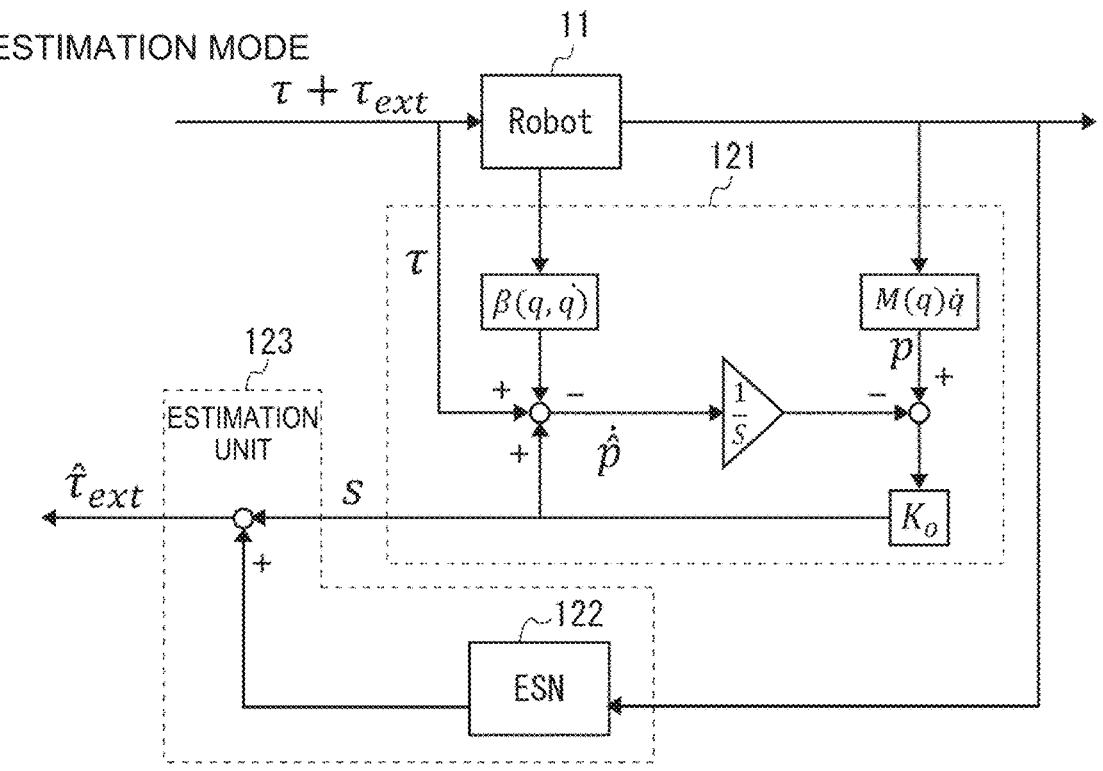

FIG. 6 is a diagram for describing operations in the respective operation modes of a power assist system 1 in which the parallel estimation method is employed. In the case of the parallel estimation, the input signal to the ESN 122 is u(t)=[$V_d^T$(t)$q^T$(t)$\dot{q}^T$(t)$\tau^T$(t)]$^T$ using the output signal $V_d$(t) of the admittance model. Further, as the output signal of the teaching signal in the learning mode, y(t)=$\tau_{ext}$(t)−s(t) is used. As shown in FIG. 6, in the case where the operation mode is the estimation mode, a value resulting from adding the output S of the MBO 121 that is calculated based on the operation of the robot 11 and the output of the ESN 122 that is calculated based on the operation of the robot 11 is used as the output $\hat{\tau}_{ext}$ of the estimation unit 123.

The power assist system 1 in which the parallel estimation method shown in FIG. 6 is employed can exert the same effect as the power assist system 1 in which the series estimation method is employed.

Furthermore, in the present disclosure, some or all of assist processes by the power assist system 1 can be realized by causing a central processing unit (CPU) to execute computer programs.

The above programs include commands (or software codes) for causing a computer to perform one or more functions described in the embodiments when the above programs are read by the computer. The programs may be stored in a non-transitory computer-readable medium or a tangible storage medium. Although being not limited, examples of the non-transitory computer-readable medium or the tangible storage medium include memory technologies such as a random-access memory (RAM), a read-only memory (ROM), a flash memory, and a solid-state drive (SSD), optical disc storages such as a CD-ROM, a digital versatile disc (DVD), and a Blu-ray® disc, and magnetic storage devices such as a magnetic cassette, a magnetic tape, and a magnetic disc storage. The programs may be sent through a transitory computer-readable medium or a communication medium. Although being not limited, examples of the transitory computer-readable medium or the communication medium include an electric propagation signal, an optical propagation signal, an acoustic propagation signal, or other types of propagation signals.

Some or all of the above embodiments can be described as the following supplement, but are not limited to the following supplement.

What is claimed is:

1. A power assist system comprising:
a robot that is worn by a user, the robot including a drive source that assists action of the user;
an interference force estimation unit that estimates an interference force given from the user to the robot;
an admittance model that generates a target velocity in a virtual object having a predetermined dynamic characteristic, the target velocity corresponding to the interference force estimated by the interference force estimation unit; and
a control unit that drives the drive source by a control torque that allows a velocity of the robot to follow the target velocity, wherein:
the interference force estimation unit includes:
a disturbance observer that detects a disturbance based on a momentum of the robot; and
an estimation unit that estimates the interference force depending on the disturbance detected by the disturbance observer, using an (echo state network) ESN learning model for which learning about the interference force depending on the disturbance is performed while weights in a reservoir layer are stochastically assigned.

2. The power assist system according to claim 1, wherein:
the ESN learning model is configured to perform learning relevant to the interference force depending on the disturbance, based on teaching data for the interference force, when an operation mode is a learning mode; and
the estimation unit estimates the interference force depending on the disturbance detected by the disturbance observer, using the ESN learning model, when the operation mode is an estimation mode.

3. The power assist system according to claim 1, wherein:
the ESN learning model is configured to perform learning using a difference between the interference force and the disturbance as teaching data, when an operation mode is a learning mode; and
the estimation unit estimates a value resulting from adding the interference force estimated using the ESN learning model and the disturbance detected by the disturbance observer, as the interference force, when the operation mode is an estimation mode.

4. The power assist system according to claim 1, wherein:
the disturbance observer is a momentum-based observer (MBO).

5. A non-transitory storage medium storing a control program causing a computer to execute an assist process by a power assist system including a robot that is worn by a user, the robot including a drive source that assists action of the user, wherein:
the control program being configured to cause the computer to execute:

a process of estimating an interference force given from the user to the robot;
a process of generating a target velocity in a virtual object having a predetermined dynamic characteristic, the target velocity corresponding to the interference force; and
a process of driving the drive source by a control torque that allows a velocity of the robot to follow the target velocity;
the control program being configured to cause the computer to, in the process of estimating the interference force, execute:
a process of detecting a disturbance based on a momentum of the robot by a disturbance observer; and
a process of estimating the interference force depending on the disturbance detected by the disturbance observer, using an ESN learning model for which learning about the interference force depending on the disturbance is performed while weights in a reservoir layer are stochastically assigned.

* * * * *